United States Patent [19]
Theis

[11] Patent Number: 5,201,028
[45] Date of Patent: Apr. 6, 1993

[54] SYSTEM FOR DISTINGUISHING OR COUNTING SPOKEN ITEMIZED EXPRESSIONS

[76] Inventor: Peter F. Theis, 3203 Bay View La., McHenry, Ill. 60050

[21] Appl. No.: 586,089

[22] Filed: Sep. 21, 1990

[51] Int. Cl.⁵ .................................................. G10L 9/00
[52] U.S. Cl. ......................................................... 395/2
[58] Field of Search ................................. 381/41–46; 364/513.5

[56] References Cited

U.S. PATENT DOCUMENTS

| | | | |
|---|---|---|---|
| 3,582,559 | 6/1971 | Hitchcock | 179/15 B |
| 3,821,472 | 6/1974 | Herscher et al. | 179/1 SA |
| 3,864,519 | 2/1975 | Owen | 381/46 |
| 3,940,565 | 2/1976 | Lindenberg | 381/43 |
| 4,004,101 | 1/1977 | Vaillant | 381/46 |
| 4,539,436 | 9/1985 | Theis | 179/6.04 |
| 4,542,525 | 9/1985 | Hopf | 381/46 |
| 4,559,416 | 12/1985 | Theis et al. | 179/7.1 R |
| 4,593,157 | 6/1986 | Usdan | 179/90 BD |
| 4,692,817 | 9/1987 | Theis | 360/12 |
| 4,783,807 | 11/1988 | Marley | 381/43 |
| 4,870,686 | 9/1989 | Gerson et al. | 381/43 |
| 4,918,730 | 4/1990 | Schulze | 381/43 |

FOREIGN PATENT DOCUMENTS 71172946 12/1969 United Kingdom.
61238113 7/1971 United Kingdom.

OTHER PUBLICATIONS

Oct. 16, 1991 International Search Report Re: Appln. Ser. No. PCT/US91/06845.
Nov. 20, 1991 British Examiner's Report to the Comptroller under Sec. 17 Re: Appln. Ser. No. 911841.6.

*Primary Examiner*—Michael R. Fleming
*Assistant Examiner*—Michelle Doerrler
*Attorney, Agent, or Firm*—Hill, Steadman & Simpson

[57] ABSTRACT

A speech categorization system includes first and second timers which generate first and second measured durations indicative of duration of selected higher and lower amplitude segments included in a voice message. A higher amplitude segment is classified in a first category when the first and second measured durations corresponding to the higher amplitude segment and an adjacent lower amplitude segment satisfy a classification test, and a counter counts the number of the higher amplitude segments classified in the first category. To detect spoken itemized words such as numbers or letters, the classification test can include the requirement that the lower amplitude segment be relatively short as compared to the preceding higher amplitude segment.

41 Claims, 6 Drawing Sheets

SYSTEM FOR DISTINGUISHING OR COUNTING SPOKEN ITEMIZED EXPRESSIONS

BACKGROUND OF THE INVENTION

This invention relates to a system for distinguishing or counting spoken itemized expressions without relying on conventional word recognition devices. It is particularly suitable for use in combination with programmed conversation recording systems.

Programmed conversation recording systems of the type described in my previous U.S. Pat. No. 4,539,436 can be used to conduct a simulated conversation with a speaker by alternately presenting the speaker with messages, and then recording spoken responses. Such programmed conversations are preferably sequenced by waiting for a pause in the spoken response to indicate that the response has been completed. By way of example, the recording system may wait for a pause of two seconds in a response before presenting a next message to the speaker.

A programmed conversation recording system can also be designed to wait for a pause to indicate that the speaker has completed his response, and then to gauge the duration of the response to determine the nature of the response. For example, a short response to the prompt "Are you calling to place an order?", can be taken as indicative of a positive answer, whereas a longer response can be taken as indicative of a negative answer. ("No, I am calling about my bill.") Note the related discussion in my previous U.S. Pat. No. 4,692,817.

Another approach to controlling a programmed conversation employs word recognition devices for specific words to recognize these words in the response. Thus, the recognition of seven or ten specific digits in the response to the prompt "May I have your phone number?" can be indicative of a complete response. However, the technology to recognize spoken digits, particularly over the telephone, is not suitable for many applications either due to high cost or insufficient reliability of such recognition systems.

It is a primary object of this invention to provide a system which distinguishes spoken itemized expressions such as words, characters, numbers and strings of words from spoken continuous speech, without relying on state of the art word recognition devices.

It is another object to provide a system which counts spoken itemized expressions such as words, characters, numbers, and strings of words.

It is another object to identify the beginning and end of a string of spoken itemized expressions.

It is another object to identify the lack of a string of spoken itemized expressions.

It is another object to measure separately the duration of high amplitude and subsequent low amplitude portions of a voice message, and to use these measured durations in order to characterize the nature, content, or duration of the expression.

SUMMARY OF THE INVENTION

According to one aspect of this invention, a method is provided for distinguishing a spoken itemized expressions from continuous speech. At least one higher amplitude segment and at least one adjacent and subsequent lower amplitude segment are identified in a spoken passage, and the duration of each is measured. The higher amplitude segment is recognized as a spoken itemized expression when the duration of the higher amplitude segment is less than a threshold value, which may be set with respect to the duration of the adjacent lower amplitude segment or alternatively as a range of values which are independent of the duration of adjacent segments. This aspect of the invention may be used to detect either the presence or the absence of spoken itemized expressions.

This method can be used to distinguish spoken itemized expressions such as voiced numbers in a zip code or a telephone number, voiced letters in a spelled name, or voiced elements of longer duration, and to distinguish such spoken itemized expressions from continuous speech. If desired, the higher amplitude segments recognized as spoken itemized expressions can be counted. For example, this approach can be used in conjunction with a programmed conversation recording system, where the course of the programmed conversation may branch in accordance with the number of digits spoken in response to the prompt "May I have your telephone number?".

According to another aspect of this invention, a voice categorization system is provided for use with a voice message of the type, having a at least one higher amplitude segments adjacent to at least one lower amplitude segment, wherein at least some of the higher amplitude segments are indicative of voiced sounds, and wherein at least some of the lower amplitude segments are indicative of periods of relative silence between adjacent voice sounds. This system includes first and second timers operative to generate first and second measured durations indicative of duration of selected higher and lower amplitude segments, respectively. Means are provided for classifying a higher amplitude segment in a first category when the first and second measured durations corresponding to the higher amplitude segment and an adjacent lower amplitude segment satisfy a classification test, and a counter counts the number of higher amplitude segments classified in the first category.

According to a third aspect of this invention, a voice categorization system for categorizing voice messages as described above includes means for developing a classification parameter indicative of relative duration of at least one of the higher amplitude segments with respect to an adjacent lower amplitude segment. Means are provided for classifying the higher amplitude segments into at least two categories, wherein one of the categories is indicative of a spoken itemized expression. This classifying means applies at least one classification test which places one of the higher amplitude segments in a first category when the respective classification parameter is greater than a threshold value, and in a second category when the respective classification parameter is less than the threshold value. The higher amplitude segments in one of the two categories are then counted to categorize the voice message.

It has been discovered that when expressions such as words, characters, numbers, and strings of words are itemized by a speaker, the duration of the pause after each itemized expression is relatively long with respect to the duration of the envelope for the expression. Furthermore, when itemizing such expressions, a speaker will typically create a rhythm. This rhythm is distinguishable because the pause after the envelope for each itemized expression will be relatively uniform in duration. In contrast, when a speaker is not itemizing expressions, he is either silent, or he generates a continuous envelope of long duration that is significantly longer than the pause between envelopes.

This discovery can be used as described below to count the number of spoken itemized expressions included in a spoken response. For example, the number of spoken itemized expressions in a speaker's response can be counted, and this number can then be used by a programmed conversation recording system to control the conversation. For example, if the prompt given to a speaker were "May I have your phone number?", a typical response may be either a ten digit number (telephone number with area code) or a seven digit number (telephone number without area code). In the first case, the programmed conversation can branch to a prompt that requests an address, while in the second case the conversation can branch to a prompt that asks for the area code. In this way, the programmed conversation can be designed to accommodate different types of responses flexibly.

The invention itself, together with further objects and attendant advantages, will best be understood by reference to the following detailed description, taken in conjunction with the accompanying drawings.

DETAILED DESCRIPTION OF THE FIGURES

DETAILED DESCRIPTION OF THE PRESENTLY PREFERRED EMBODIMENTS

Figure 1:
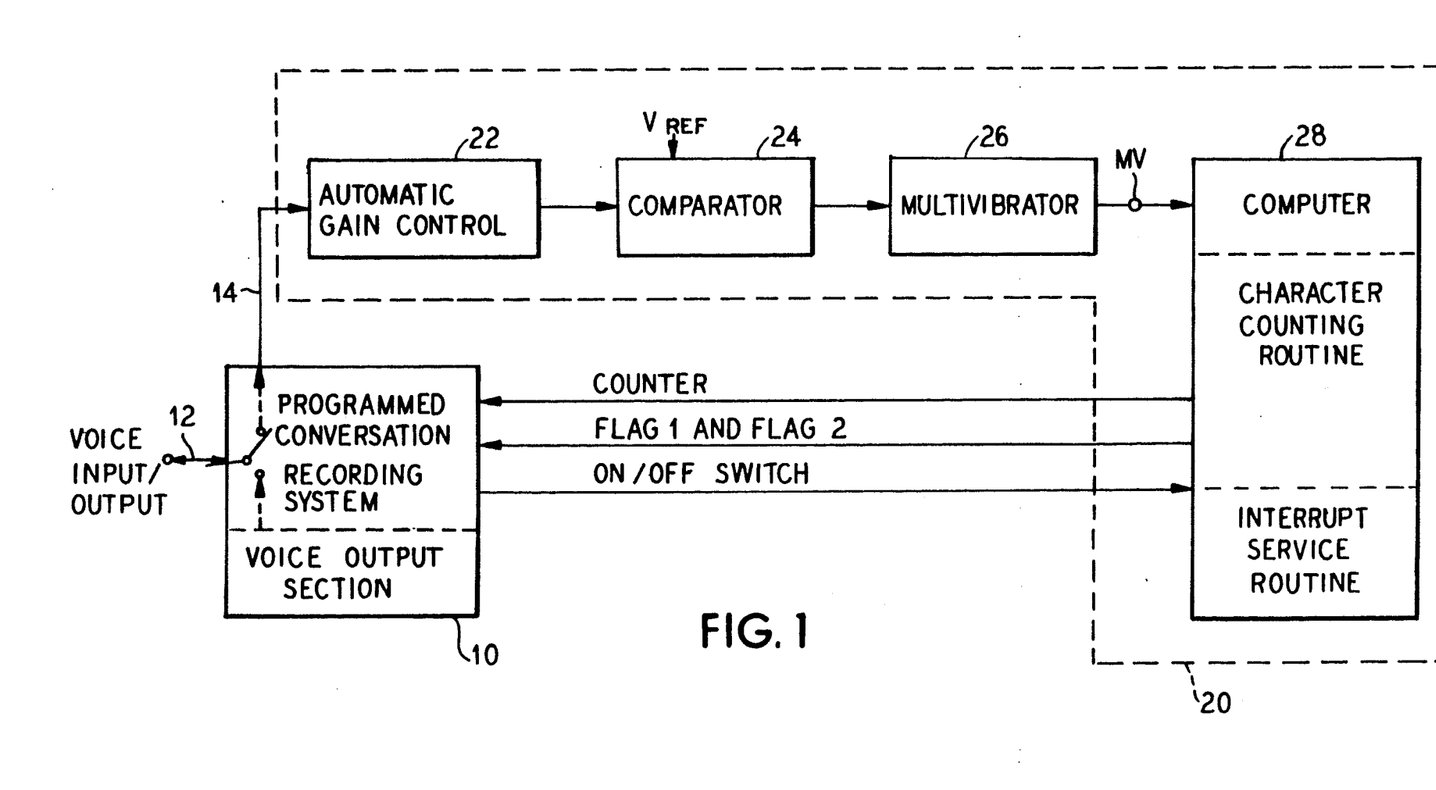
FIG. 1 is a block diagram of a programmed conversation recording system which includes a presently preferred embodiment of this invention.

FIG. 1 shows a block diagram of a programmed conversation recording system 10 which is connected to a combination voice input and voice output 12. The programmed conversation recording system 10 does not per se form part of this invention and can be constructed as described, for example, in my previous U.S. Pat. Nos. 4,539,536 or 4,692,817. In general, the programmed conversation recording system 10 monitors responses of a user such as a caller appearing at the voice input/output 12 and presents messages to the user or caller at the voice input/output 12. The voice input/output 12 may be connected to a telephone line when desired. However, it is not essential in all applications that the programmed conversation recording system 10 be used in conjunction with a telephone network, and alternate arrangements including radio links or hard wired links are possible.

In this embodiment, the programmed conversation recording system 10 simulates a conversation by presenting the speaker with messages which are typically questions, and by recording the speaker's responses to these messages. As pointed out below, the system 10 may alter the course of the programmed conversation depending upon the content of the speaker's response, as determined by the categorization system 20. The system 10 monitors the input/output 12 and automatically switches voice responses from a user to a line 14.

The categorization system 20 includes an automatic gain control circuit 22 which receives spoken responses appearing at the line 14. The automatic gain control circuit 22 amplifies the spoken response by an amount so the peak output of a set of spoken responses equals a pre-established level. One suitable device is disclosed in U.S. Pat. No. 4,112,384 "Controlled Recovery Automatic Gain Control Amplifier", but other commercially available automatic gain control circuits are also suitable.

The amplified spoken response generated by the automatic gain control circuit 22 is applied as an input to a comparator 24 which compares the amplified spoken response with a threshold voltage $V_{ref}$. This threshold voltage is set to distinguish voiced speech from background voice, noise, and distant voice or whispers. Preferably, the threshold voltage is adjustable depending upon the accuracy needed. A higher level for $V_{ref}$ is more certain to detect only the desired voiced expressions, but may miss some spoken itemized expressions, particularly the second syllable of a two digit number, whereas a lower value for $V_{ref}$ may detect undesirable speech, but has a lower likelihood of missing spoken itemized expressions. A slightly more complex arrangement would be to provide two threshold levels, one to detect peak speech, and a second to separate softer speech from a pause in speech. This approach would slightly increase the complexity of subsequent digital processing, but it would simplify proper adjustment of the threshold values.

The output of the comparator 24 is a two state binary signal indicative of whether the output of the automatic gain control circuit 22 is greater or less than $V_{ref}$. This output signal is used to trigger a monostable multivibrator 26. The multivibrator 26 generates an output signal MV which is placed in the logic high state whenever the multivibrator 26 is triggered by the comparator 24, and which remains in the high state for a brief period of time such as ten milliseconds, unless retriggered while in the high state. This binary signal MV is applied as an input to a computer 28 that executes the routines flow charted in FIGS. 2A, 2B and 3.

In the following discussion, periods of time in which the signal MV is in the logic high state will on occasion be referred to as higher amplitude segments. Similarly, when the multivibrator 26 has not been triggered in the last ten milliseconds by the comparator 24, the signal MV is in the logic low state, indicative of a lower amplitude segment.

Figure 2A:
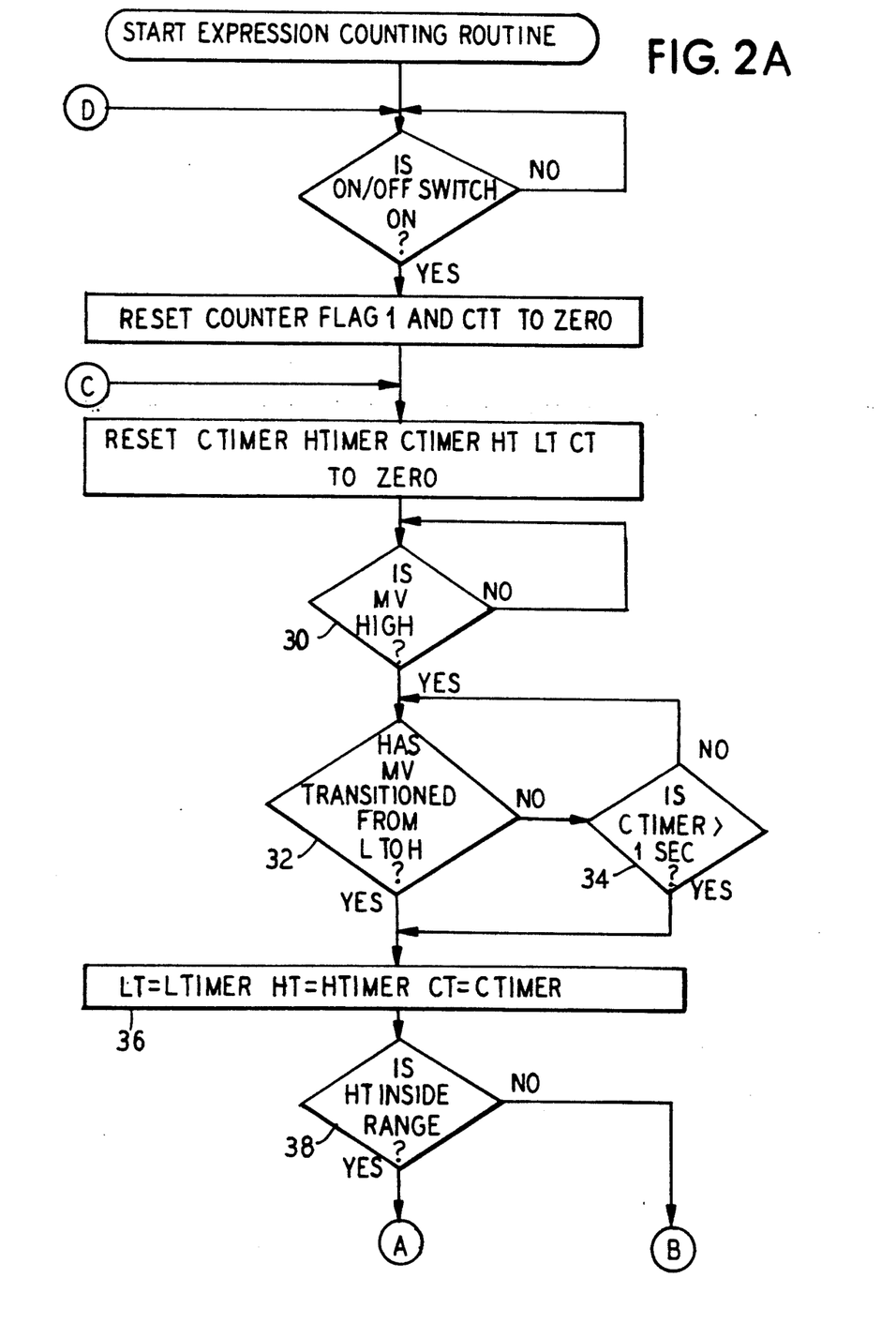
FIGS. 2A and 2B together constitute a flow chart of the character counting routine of FIG. 1.
Figure 2B:
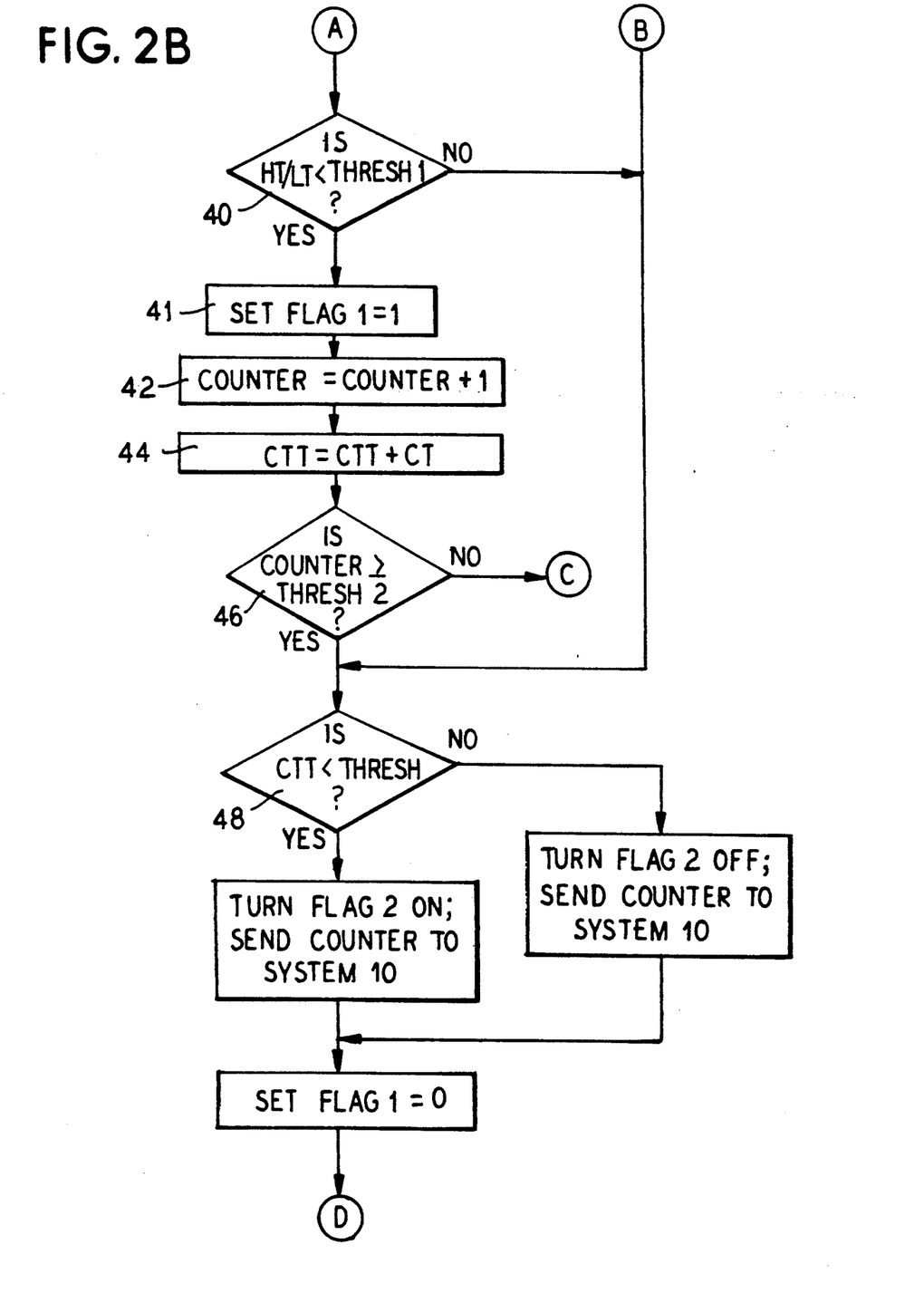

The signal MV is used by the expression counting routine flow charted in FIGS. 2A and 2B to detect the pattern of higher amplitude segments and lower amplitude segments indicative of spoken itemized expressions and to count such expressions. Counted expressions are transmitted back to the programmed conversation recording system 10 by the variable COUNTER, along with the variables FLAG 1 (indicative of whether a voiced response is recognized as an itemized expression or not) and FLAG 2 (indicative of whether the counting process exceeded a maximum counting interval). Also, as shown in FIG. 1, the system 10 controls a on/off switch that supplies a signal to the computer 28 to enable or disable the character counting routine.

Figure 4A:
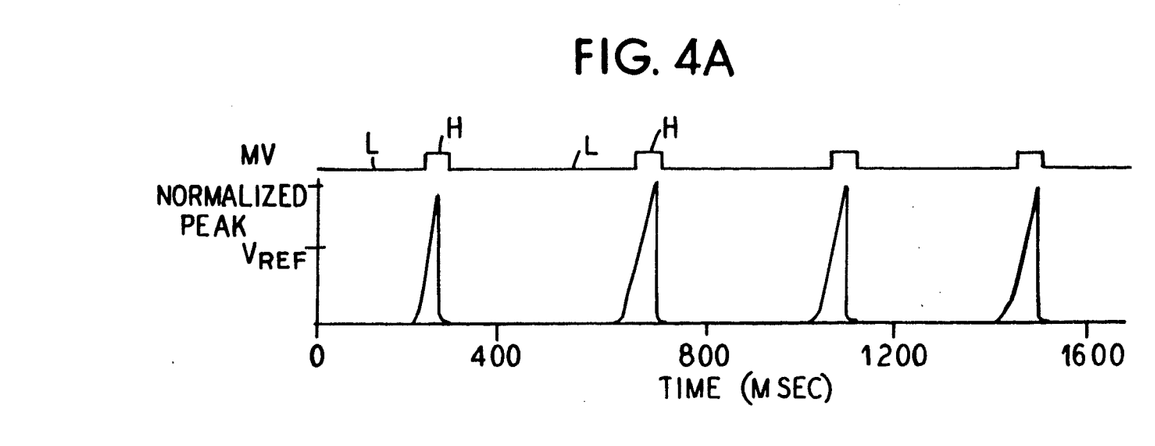
FIGS. 4A through 4C are waveform diagrams of portions of typical speech patterns for voiced characters (FIG. 4A), voiced paired characters (FIG. 4B), and a voiced sentence (FIG. 4C).
Figure 4B:
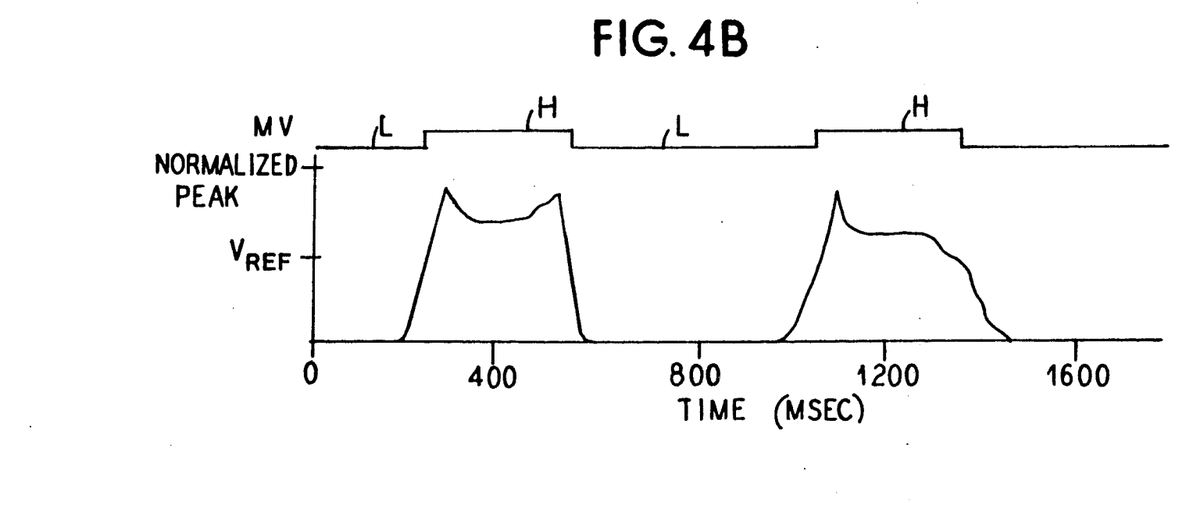
Figure 4C:
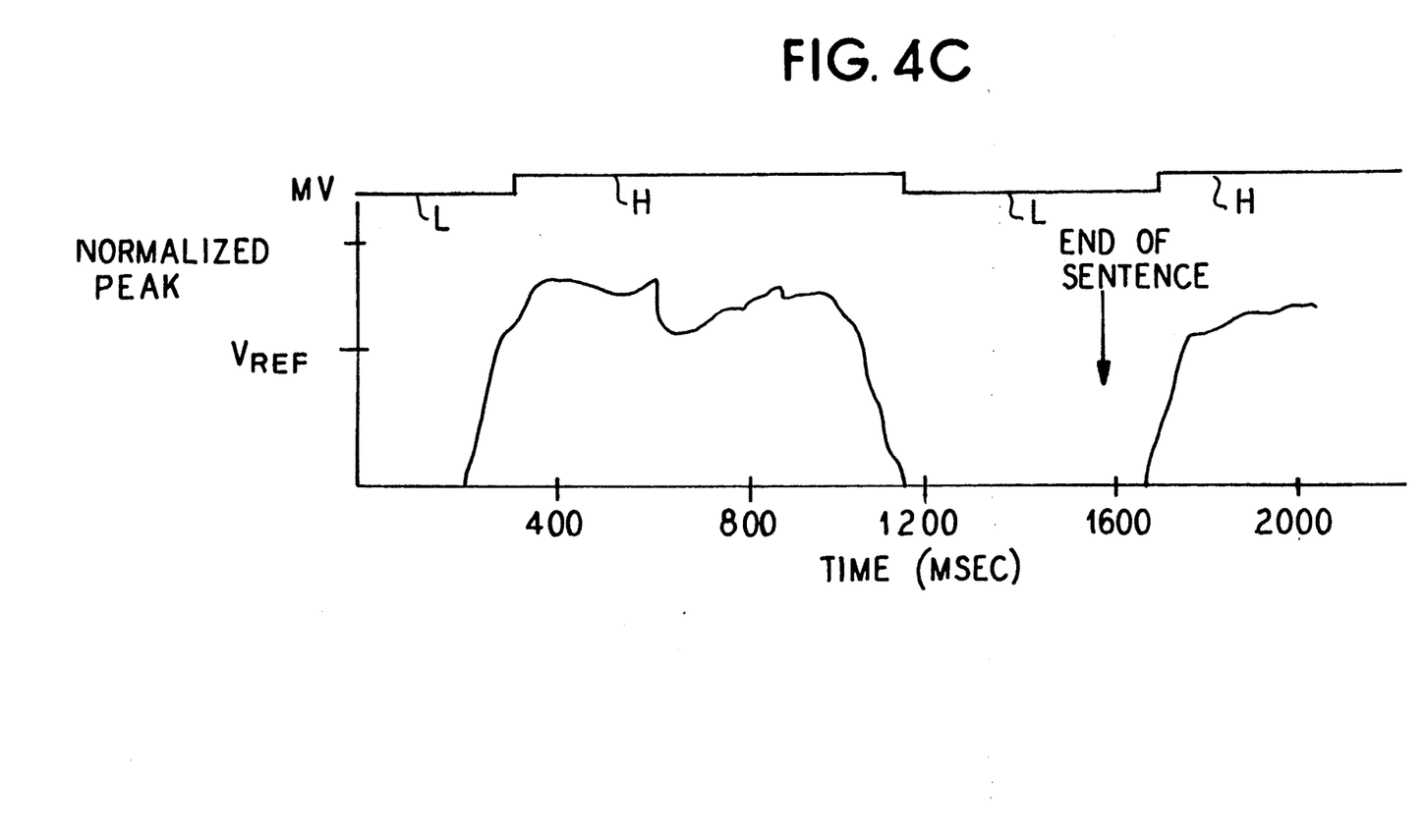

Before proceeding to a discussion of the character counting routine, FIGS. 4A through 4C illustrate characteristics of spoken itemized expressions which are important in the operation of this routine.

FIG. 4A shows a series of waveforms representative of the positive side of the envelope of a series of spoken itemized expressions such as characters, as they appear at the output of the automatic gain control circuit 22. Note that the duration of the cycle of a voiced character and the subsequent period of silence is about 400 ms. Of this cycle, the voiced portion is relatively shorter than the silence portion. The pattern of FIG. 4A is characteristic of four voiced numbers, four voiced alphabetics, or four voiced short words. As used herein, the term "expressions" will be used to encompass characters (both numerics and alphabetics), words, and brief multiword expressions.

FIG. 4B shows numbers voiced as two number sets (such as "25"). Note that the cycle of time of a voiced sound and the adjacent period of silence is approximately twice as long as when a single character is spoken (FIG. 4A). However, the voiced portion is still substantially shorter than the silence portion. Note also that the trailing half of the voiced portion is lower than the leading edge, but is still significant in amplitude.

FIG. 4C shows waveforms typical of continuous voice such as is encountered in a spoken sentence that lacks itemized expressions. Note that the gaps between words and syllables of the sentence are virtually non-existent. Thus the phrase "I would like to speak to an operator" will often appear as a full second of voiced sound. There will be a pause before the next sentence but, unlike the situation described above in conjunction with itemized words such as characters, the duration of a pause before a second sentence will typically be short compared with the preceding speech portion.

FIGS. 4A through 4C show the normalized peak as determined by the automatic gain control 22, along with the threshold $V_{ref}$. The horizontal axis is measured in milliseconds. Also, FIGS. 4A through 4C show the signal MV as generated by the multivibrator 26. In the illustrated waveform for MV, higher amplitude segments are indicated with the reference symbol H and lower amplitude segments with the reference symbol L. As shown in FIGS. 4A through 4C, the ratio of the duration of a higher amplitude segment H to the duration of the subsequent lower amplitude segment L is indicative of the content of the voiced response. It has been discovered that, for one important class of itemized expressions, the number of items voiced in a group in a voiced response can be counted by counting the number of higher amplitude segments H that are typically followed by relatively long lower amplitude segments L. Of course, other types of itemized expressions may require other selection criteria.

This approach can be used to count the number of spoken itemized expressions such as (1) numbers in a zip code or telephone number or (2) letters in a spelled name or (3) a mix of numbers, letters and other words such as "P.O. Box 23." Also, this approach can be used to count the number of longer elements voiced in a group or list, such as a list of items being ordered.

Though the following discussion of the character counting routine of FIGS. 2A and 2B focuses on the recognition of characters, this invention also finds application in counting longer elements voiced in a list or group.

Figure 3:
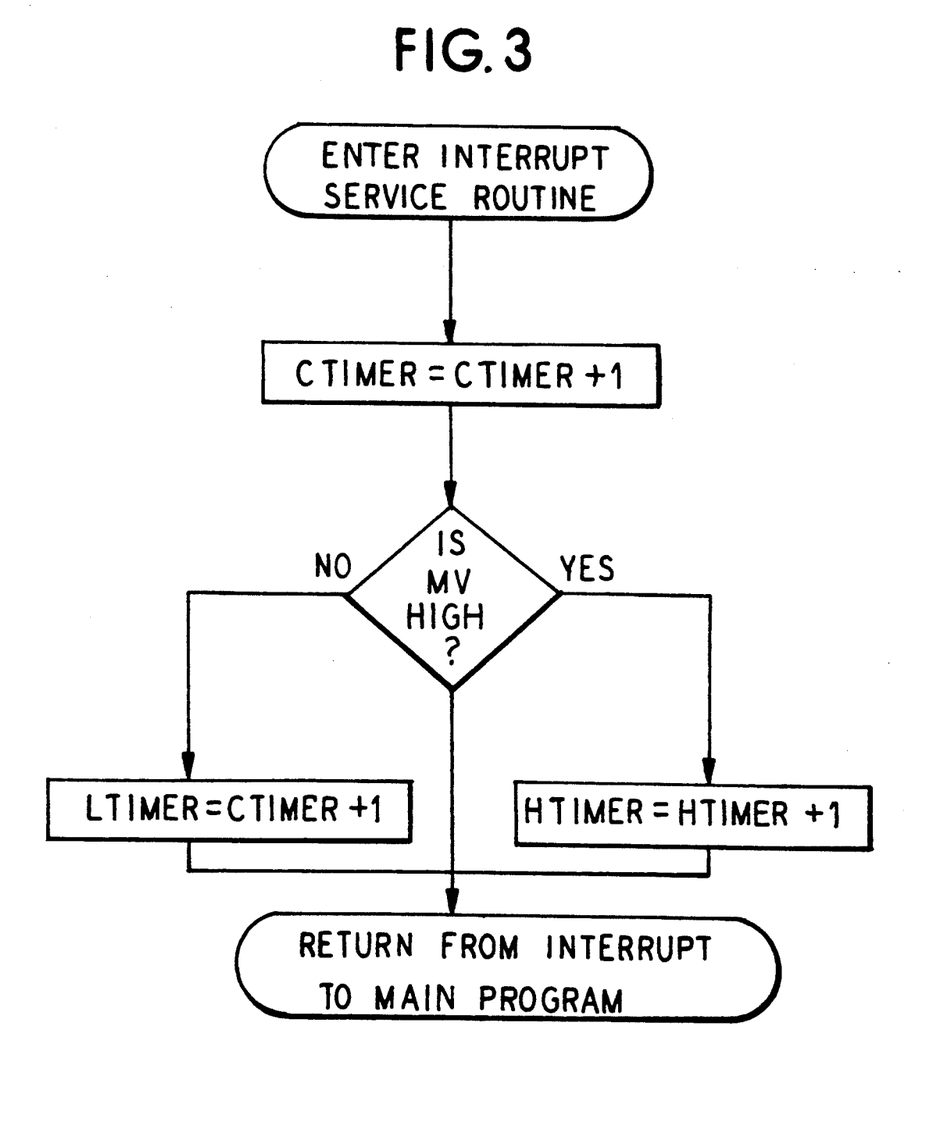
FIG. 3 is a flow chart of the interrupt service routine of FIG. 1.

Before discussing the character counting routine of FIGS. 2A and 2B, reference should be made to FIG. 3, which flow charts the interrupt service routine that increments three timers LTIMER, HTIMER and CTIMER. This interrupt service routine is executed periodically, for example, once every millisecond. The routine increments CTIMER by one and then tests the signal MV. If MV is in the logic high state, HTIMER is incremented. Otherwise LTIMER is incremented before the routine returns from the interrupt back to the character counting routine. The interrupt service routine of FIG. 3 causes LTIMER, HTIMER and CTIMER to operate as timers of the low amplitude segments, high amplitude segments, and total cycle time, respectively.

Turning now to FIGS. 2A and 2B, the character counting routine of FIG. 1 begins by checking the state of the on/off switch generated by the system 10. The routine waits until the on/off switch is turned on, and then the variables COUNTER, FLAG 1 and CTT are reset to zero. Next, the variables LTIMER, HTIMER, CTIMER, HT, LT, CT are all reset to zero. The routine then waits in block 30 until the signal MV enters the high state, indicative of a higher amplitude segment. Once this occurs the routine then waits in blocks 32 and 34 until MV transitions from the low state to the high state or LTIMER exceeds one second. When either condition is satisfied, LTIMER is stored as LT, HTIMER is stored as HT and CTIMER is stored as CT.

At this point, the routine has measured the duration of a higher amplitude segment with HTIMER and stored this duration in the variable HT, and has measured the duration of a following lower amplitude segment with LTIMER and stored this duration in the variable LT. CTIMER at this point contains a number indicative of the duration of the cycle (made up of one higher amplitude segment and the following lower amplitude segment), and the value of CTIMER has been stored in CT.

Once an individual cycle has been completed and LT, HT and CT have been stored in block 36, the routine then checks to determine whether HT is within a range of values indicative of an anticipated expression. For example, this range is preferably between 20 milliseconds and 250 milliseconds when the anticipated expression is a single digit or character. If HT is only 10 milliseconds, this indicates that the multivibrator 26 was triggered only once and that the corresponding higher amplitude segment was probably due to a noise spike. Similarly, if HT is greater than 250 milliseconds, this indicates that the higher amplitude segment corresponding to HT has a duration substantially longer than that anticipated for a single digit character. In either event, HT is not considered to be indicative of a digit or a character and block 38 branches to node B. If HT is within the anticipated range characteristic of a character, block 38 branches to node A. Of course, the particular range of values used as indicative of an expression can range widely, depending on the type of expression that is of interest.

As shown in FIG. 2B, the routine proceeds from node A to check the ratio of HT divided by LT in comparison with the threshold THRESH1. As pointed out above, digits or characters, when voiced by the average person, are followed by a period of relative silence which is typically longer than the duration of the voiced character. Thus, characters will typically have a ratio HT/LT less than 1, while sentence phrases and other continuous speech will have a ratio HT/LT substantially greater than 1. In this example, THRESH1 is set equal to 1, and block 40 classifies the cycle as having a ratio either indicative of a digit or character or not. Of course, the value of THRESH1 can vary widely, depending on the type of expression that is of interest. For example, THRESH1 can be set as high as 20 or as low as 1 or 2.

If the ratio HT/LT is indicative of a digit or character, the variable FLAG 1 is set equal to 1 in block 41 to indicate that an itemized expression (in this case a digit or character) has been detected, the variable COUNTER is incremented in block 42 and CT is added to the variable CTT in block 44. In this embodiment, COUNTER contains a number indicative of the number of digits or characters counted by the routine. CTT is a variable indicative of the total duration of each of the individual cycles classified as containing a voiced digit or character. In this example, both the absolute length of HT and the ratio HT/LT are used as two separate tests of whether a digit or character is present. Either test can be used above to discriminate digits or characters, but it is preferred to use both tests together for best results.

Once COUNTER and CTT have been incremented, COUNTER is then compared with THRESH2. THRESH2 is a threshold indicative of the number of digits or characters anticipated in the response. For example, if the system 10 has requested a zip code, THRESH2 may be set equal to 6. Block 46 branches to node C to continue counting additional characters if COUNTER is less than THRESH2.

Otherwise, block 46 branches to block 48, in which CTT is compared with THRESH3. THRESH3 is a variable indicative of the anticipated maximum duration of all of the character cycles counted by the routine. In this example, THRESH3 can be set at approximately 120 milliseconds times THRESH2, i.e., a maximum cycle time for each character of 120 milliseconds. If CTT is less than THRESH3, indicating that the expected number of digits or characters were spoken within the time period defined by THRESH3, then the variable FLAG 2 is turned on and the amount stored in the COUNTER is sent to the system 10. Alternately, if CTT is greater than or equal to THRESH3, then the variable FLAG 2 is turned off and the contents of the COUNTER are sent to system 10. The routine then sets FLAG 1 to zero to indicate the termination of itemized expressions and then returns to node D to continue searching for additional characters as long as the on/off switch is turned on by the system 10.

If HT is outside the anticipated range indicative of a character in block 38, or if the ratio HT/LT is greater than or equal to THRESH1 in block 40, the routine then branches directly to block 48 to compare CTT with THRESH3.

The routine of FIGS. 2A and 2B classifies a higher amplitude segment as a voiced expression only if (1) the higher amplitude segment has a duration indicative of an expression and (2) the ratio between the duration of the higher amplitude segment and the duration of the following lower amplitude segment is also indicative of an expression. Operation of the counter is terminated (1) when COUNTER reaches the anticipated maximum number of expressions (THRESH2) or (2) when the total duration of all counted expression cycles exceeds THRESH3. FLAG 1 indicates transitions between continuous speech and itemized expressions. In particular, FLAG 1 changes state at both the start and stop of a string of spoken itemized expressions.

The routine of FIGS. 2A and 2B counts the higher amplitude segments that meet the test for an expression to determine the nature of the response and when the response has been completed. The routine provides the system 10 with a count of the number of expressions detected. This can be used by the system 10 to control branching of the programmed conversation. For example, if the system 10 requests a zip code and then turns the on/off switch on for the entirety of the respondent's answer, the variable COUNTER supplied by the character counting routine will indicate the number of characters spoken by the respondent, without specifically recognizing the identity of any individual expression.

In this example, if the character counting routine counts 5 digits, the system 10 can be programmed to go on to a next question. If fewer than 5 digits are counted, the system 10 can be programmed to request the zip code again. As another example, if the system 10 is programmed to request the respondent's telephone number, and the character counting routine counts 6 to 8 digits, the system 10 can be programmed to request an area code. If the character counting routine counts 9 to 11 characters, the system 10 can be programmed to continue. If the character counting routine counts fewer than 7 characters, the system 10 can be programmed to repeat its request for the respondent's telephone number.

It should be understood that the character counting routine performs a useful function even if the count of characters is not completely accurate. In the foregoing example, if the character counting routine counts fewer than 5 characters, it is probable that the telephone number was not given and the prompt should be repeated. If the routine counts between 6 and 8 characters, it is probable that the telephone number was given without an area code, and that the area code should be requested as the next prompt to be sure. If the character counting routine counts between 9 and 13 characters, the entire telephone number with area code was probably voiced. Finally, if the character counting routine counts more than twelve characters, there may be a high probability that the respondent was not responding correctly to the question.

The relative length of the lower amplitude periods can be indicative of an answer or a non-answer. For example, when asking for a phone number the speaker's response will include an appropriate number of characters if the speaker has answered the question. However, if the speaker answers "Which phone number do you want?", the number of spoken itemized expressions would be too small to indicate a completed phone number and the duration too long for a single digit expression. The response could then be identified as a non-character response. "Do you want" could be misinterpreted as a string of three characters only if these words were spoken discretely rather than being slurred as is much more typical. Thus, though the preferred embodiment described above counts expressions, this invention can also be used to distinguish speech phrases from other utterances, or to detect the end of phrases or sentences. Such detection would be based on a period of lower amplitude after a relatively long period of voice at a higher amplitude, i.e., a time ratio of higher amplitude to lower amplitude which was very high (10 or more).

Furthermore, this invention can be implemented in systems which dynamically respond to the pattern of the speaker's response. If the name WASHINGTON is being spelled, the pace of the characters being voiced will often be relatively constant for any individual speaker. Thus, characters can be detected based on a pace as well as or instead of on a fixed ratio of the duration of higher and lower amplitude segments. In this context, pace is a dynamically established ratio of higher amplitude segment duration to lower amplitude segment duration computed based on the speaking of several characters.

When this approach is taken it may be important to note that there may be longer duration lower amplitude periods from time to time, such as is characteristic of the break between the area code and the prefix in a ten digit telephone number. This alternative is anticipated and therefore can be incorporated into the discrimination program. For example, for a string of digits that make up a social security number, the ratio of duration of higher amplitude to lower amplitude segments can vary without a significant variation in the duration of the higher amplitude segments Such a variation can be taken as an indication of a change in the grouping of numbers. The pattern of digits in a social security number is 3, 2, 4. Thus, if the last group was found to have only three detected characters, the system 10 could be programmed to request that the last four digits of the social security number be repeated.

The functions described above can be modified and adapted for individual applications, and they can be implemented with a wide range of hardware, including many commonly available computer systems. The expression recognition routine can be implemented by a separate computer as shown in FIG. 1, or it can be integrated into the system 10. Additionally, higher and lower amplitude segments may be distinguished from one another using other criteria, including slope, amplitude excursion, or presence of selected frequency signals. Relative measures of duration may be used instead of absolute measures, and analog measuring techniques such as capacitor charging techniques may be substituted for the digital techniques discussed above.

Of course, it should be understood that a wide range of changes and modifications can be made to the preferred embodiments described above. For example, the present invention can readily be adapted for use with systems such as security systems that do not conduct programmed conversations, or that do not present outgoing messages. Additionally, times for the total cycle time and either the higher or lower segment time may be used instead of HTIMER and LTIMER. It is therefore intended that the foregoing detailed description be regarded as illustrative rather than limiting, and that it be understood that it is the following claims, including all equivalents, which are intended to define the scope of this invention.

I claim:

1. In a system having a voice processor for processing speech and responsively producing a waveform representing information of said speech, said waveform defining a high amplitude segment above a predetermined reference level and a low amplitude segment below said predetermined reference level, a method for recognizing a spoken itemized expression speech comprising the following steps:
   sensing said waveform;
   identifying at least one high amplitude segment and at least one low amplitude segment in said sensed waveform, said low amplitude segment being adjacent and subsequent in time to said high amplitude segment;
   measuring a duration of said identified high amplitude segment with respect to said identified low amplitude segment; and
   producing a signal indicating a spoken itemized expression has been recognized when said high amplitude segment is shorter in duration than a threshold value, said threshold value being no greater than 20 times the duration of said low amplitude segment.

2. A method as claimed in claim 1 wherein the step of producing a signal indicating a spoken itemized expression has been recognized includes the step of determining a ratio indicative of comparative duration of said identified high and identified low amplitude segments and producing a signal indicating a spoken itemized expression has been recognized when said ratio is within a selected range of values.

3. A method as claimed in claim 1 wherein said spoken itemized expression which is to be recognized comprises a character.

4. A method as claimed in claim 1 wherein said threshold value is substantially no greater than twice said duration of said adjacent and low amplitude segment.

5. In a system having a voice processor for processing speech and responsively producing a waveform representing information of said speech, said waveform defining a high amplitude segment above a predetermined reference level and a low amplitude segment below said predetermined reference level, a method for recognizing a spoken itemized expression comprising the following steps:
   sensing said waveform;
   identifying at least one high amplitude segment and at least one low amplitude segment in said sensed waveform, said low amplitude segment being adjacent and subsequent in time to said high amplitude segment;
   measuring a duration of said identified high amplitude segment prior in time to said identified low amplitude segment; and
   producing a signal indicating a spoken itemized expression has been recognized when said high amplitude segment has a duration within a selected range of values.

6. A method as claimed in claim 5 wherein said selected range of values is greater than 10 milliseconds and less than 250 milliseconds.

7. A method as claimed in claim 5 wherein said selected range of values includes values less than a specified maximum value.

8. In a system having a voice processor for processing speech and responsively producing a waveform representing information of said speech, said waveform defining a high amplitude segment above a predetermined reference level and a low amplitude segment below said predetermined reference level, a method for recognizing a spoken itemized expression comprising the following steps:
   sensing said waveform;
   identifying at least one high amplitude segment and at least one low amplitude segment in said sensed waveform, said low amplitude segment being adjacent and subsequent in time to said high amplitude segment;
   measuring a duration of said identified high amplitude segment with respect to said identified low amplitude segment;

determining a ratio indicative of comparative duration of said identified high and identified low amplitude segments; and producing a signal indicating a spoken itemized expression has been recognized when said ratio is within a selected range of values.

9. A method as claimed in claim 1 or 5 or 8 wherein said itemized expression which is to be recognized is selected from the group consisting of individual words, digits, and characters.

10. A method as claimed in claim 1 or 5 or 8 wherein said identified high and low amplitude segments each comprise a plurality of segments and wherein said method further comprises the step of counting each high amplitude segment as a spoken itemized expression.

11. A method as claimed in claim 10 wherein said step of counting each high amplitude segment comprises the step of interrupting counting when a selected number of high amplitude segments are counted as spoken itemized expressions.

12. A method as claimed in claim 10 wherein said step of counting each high amplitude segment comprises the step of interrupting counting after a selected counting interval has elapsed.

13. A method as claimed in claim 10 wherein the step of counting each high amplitude segment comprises the step of interrupting counting in response to a high amplitude segment which is substantially longer in duration than an adjacent and subsequent in time low amplitude segment.

14. A method as claimed in claim 10 wherein the counting step comprises the step of interrupting counting in response to a high amplitude segment having a duration longer than a selected value.

15. A method as claimed in claim 14 wherein said selected value varies as a function of said duration of said adjacent low amplitude segment.

16. A method as claimed in claim 1 or 5 or 8 further comprising the step of recognizing a transition from a spoken itemized expression and responsively producing a transition signal.

17. A method as claimed in claim 16 wherein the step of producing a transition signal comprises the step of producing a signal in response to a first spoken itemized expression recognized.

18. A method as claimed in claim 16 wherein the step of producing a transition signal comprises the step of producing a signal in response to a last spoken itemized expression recognized.

19. In a system having a voice processor for processing speech and responsively producing a waveform representing information of said speech, said waveform defining a high amplitude segment above a predetermined reference level and a low amplitude segment below said predetermined reference level, said waveform comprising at least one high amplitude segment and at least one low amplitude segment, at least some of said high amplitude segments indicating speech, at least some of said low amplitude segments indicating periods of non-speech between adjacent speech segments, a speech categorization system for counting spoken itemized expressions comprising, in combination:

sensing means for sensing said waveform;

timer means, interconnected to said sensing means, for generating first and second measured durations, wherein said first measured durations vary as a function of duration of high amplitude segments, and wherein said second measured durations vary as a function of low amplitude segments;

classification means for classifying a high amplitude segment in a first category when said first and second measured durations corresponding to said high amplitude segment and an adjacent and subsequent in time low amplitude segment satisfy a classification test; and a counter for counting said high amplitude segments classified in said first category, said high amplitude segments classified in said first category corresponding to said spoken itemized expressions.

20. A system as claimed in claim 19 wherein said classification means comprises:

determination of means for establishing a ratio of said first and second durations; and comparison means for comparing said ratio to a selected value and for classifying said high amplitude segment in said first category when said ratio has a selected relationship to said selected value.

21. In a system having a voice processor for processing speech and responsively producing a waveform representing said speech, said waveform defining a high amplitude segment above a predetermined reference level and a low amplitude segment below said predetermined reference level, said waveform comprising at least one high amplitude segment and at least one low amplitude segment, at least some of said high amplitude segments indicating speech, at least some of said low amplitude segments indicating periods of non-speech between adjacent speech segments, a speech categorization system for counting spoken itemized expressions comprising, in combination:

sensing means for sensing said waveform;

a timer, interconnected to said sensing means, for generating first measured durations, wherein said first measured durations vary as a function of duration of high amplitude segments;

specification means for classifying a high amplitude segment in a first category, when the respective first measured duration satisfies a classification test; and a counter for counting high amplitude segments classified in said first category, said high amplitude segments classified in said first category corresponding to said spoken itemized expressions.

22. A system as claimed in claim 19 or 21 wherein said first category is indicative of a voiced expression.

23. A system as claimed in claim 19 or 21 further comprising interruption means for interrupting operation of said counter after a selected interval.

24. A system as claimed in claim 19 or 21 further comprising interruption means for interrupting operation of said counter after a selected number of high amplitude segments have been counted.

25. In a system having a voice processor for processing speech and responsively producing a waveform representing information of said speech, said waveform defining a high amplitude segment above a predetermined reference level and a low amplitude segment below said predetermined reference level, said waveform comprising at least one high amplitude segment and at least one low amplitude segment, at least some of said high amplitude segments indicating speech, at least some of said low amplitude segments indicating periods of non-speech between adjacent speech segments, a speech categorization system for classifying spoken itemized expressions comprising, in combination:

sensing means for sensing said waveform;

timer means, interconnected to said sensing means, for generating first and second measured durations, wherein said first measured durations vary as a function of duration of high amplitude segments, and wherein said second measured durations vary as a function of low amplitude segments; and classification means for classifying a high amplitude segment as a spoken itemized expression based on when said first and second measured durations for said higher amplitude segment and said adjacent said subsequent low amplitude segment satisfy a classification test.

26. A system as claimed in claim 25 wherein said classification means comprises:

determination means for taking a ratio of said first and second durations; and comparison means for comparing said ratio to a selected value and for classifying said high amplitude segment as a spoken itemized expression when said ratio has a selected relationship to said selected value.

27. A system as claimed in claim 25 wherein said classification means comprises comparison means for comparing said first and second durations and for classifying said high amplitude segment as a spoken itemized expression when said first duration is less than said second duration.

28. A system as claimed in claim 25 further comprising a counter for counting said high amplitude segments classified as spoken itemized expressions.

29. A system as claimed in claim 28 further comprising interruption means for interrupting operation of said counter after a selected interval.

30. A system as claimed in claim 28 further comprising interruption means for interrupting operation of said counter after a selected number of high amplitude segments have been counted.

31. In a system having a voice processor for processing speech and responsively producing a waveform representing information of said speech, said waveform defining a high amplitude segment above a predetermined reference level and a low amplitude segment below said predetermined reference level, said waveform comprising at least one high amplitude segment and at least one low amplitude segment, at least some of said high amplitude segments indicating speech, at least some of said low amplitude segments indicating periods of non-speech between adjacent speech segments, speech categorization system for counting spoken itemized expressions comprising in combination:

parameter means for developing a classification parameter indicative of comparative duration of at least some of said higher amplitude segments with respect to adjacent low amplitude segments;

classification means for classifying said high amplitude segments into at least two categories, wherein one of said categories is indicative of a spoken itemized expression, said classification means applying at least one classification test, said test placing one of said high amplitude segments in a first category when the respective classification parameter meets a threshold value and placing one of the said high amplitude segments in said second category when the respective classification parameter fails to meet said threshold value; and counting means for counting said high amplitude segments in said first category to characterize said voice message.

32. A system as claimed in claim 31 wherein each of said classification parameter is indicative of a ratio between said duration of one of said high amplitude segments and said duration of an adjacent one of said low amplitude segments.

33. A system as claimed in claim 31 wherein said parameter means comprises:

a first timer for timing duration of at least some high amplitude segments to generate a first measured duration;

a second timer for timing duration of at least some low amplitude segments adjacent to said selected high amplitude segments to generate a second measured duration; and determination means for taking a ratio of said first and second measured durations, wherein said classification parameter varies as a function of said ratio.

34. A system as claimed in claim 31 wherein said first category is indicative of a spoken itemized expression and wherein said system further comprises means for classifying a high amplitude segment in said second category when said high amplitude segment has a duration greater than a selected value.

35. A system as claimed in claim 31 further comprising interruption means for interrupting operation of said counting means after a selected interval.

36. A system as claimed in claim 31 further comprising interruption means for interrupting operation of said counting means after a selected number of high amplitude segments have been counted.

37. A system as claimed in claim 31 wherein said spoken itemized expression is a voice character.

38. In a system having a voice processor for processing speech and responsively producing a waveform representing said information of speech, said waveform defining a high amplitude segment above a predetermined reference level and a low amplitude segment below said predetermined reference level, a method for recognizing a spoken itemized expression comprising the following steps:

sensing said waveform;

identifying at least one high amplitude segment and at least one low amplitude segment in said sensed waveform, said low amplitude segment being adjacent and subsequent in time to said high amplitude segment;

measuring a duration of said identified high amplitude segment with respect to said identified low amplitude segment;

producing an alternate signal, in an absence of a spoken itemized expression, when said high amplitude segment is substantially longer in duration than said adjacent and subsequent in time low amplitude segment.

39. In a system having a voice processor for processing speech and responsively producing a waveform representing information of said speech, said waveform defining a high amplitude segment above a predetermined reference level and a low amplitude segment below said predetermined reference level, a method for recognizing a spoken itemized expression comprising the following steps:

sensing said waveform;

identifying at least one high amplitude segment and at least one low amplitude segment in said sensed waveform, said low amplitude segment being adjacent and subsequent in time to said high amplitude segment;

measuring a duration of said identified high amplitude segment prior in time to said identified low amplitude segment;

producing an alternate signal, in an absence of a spoken itemized expression, when said high amplitude segment has a measured duration within a selected range of values.

40. In a system having a voice processor for processing speech and responsively producing a waveform representing information of said speech, said waveform defining a high amplitude segment above a predetermined reference level and a low amplitude segment below said predetermined reference level, a method for recognizing a spoken itemized expression comprising the following steps:

sensing said waveform;

identifying at least one high amplitude segment and at least one low amplitude segment in said sensed waveform, said low amplitude segment being adjacent and subsequent in time to said high amplitude segment;

measuring a duration of said identified high amplitude segment with respect to said identified low amplitude segment;

determining a ratio indicative of comparative duration of said high and low amplitude segments; and producing an alternate signal in an absence of a spoken itemized expression, when said ratio is within a preselected range of values.

41. A method as claimed in claim 38 or 39 or 40 wherein said spoken itemized expression is selected from the group consisting of words, digits, and characters.

* * * * *